US008745039B2

(12) United States Patent
Dube et al.

(10) Patent No.: US 8,745,039 B2
(45) Date of Patent: Jun. 3, 2014

(54) METHOD AND SYSTEM FOR USER GUIDED SEARCH NAVIGATION

(75) Inventors: Parijat Dube, Hawthorne, NY (US); Rahul Jain, Hawthorne, NY (US); Ramakrishnan Kannan, TamilNadu (IN); Karthik Subbian, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 12/567,472

(22) Filed: Sep. 25, 2009

(65) Prior Publication Data

US 2011/0078140 A1 Mar. 31, 2011

(51) Int. Cl.
*G06F 17/30* (2006.01)

(52) U.S. Cl.
USPC .......... 707/722; 715/206; 715/854; 715/855

(58) Field of Classification Search
CPC .......... G06F 17/30873; G06F 17/30867; G06F 17/30899; G06F 17/30696; G06F 2216/07
USPC .......................... 707/722; 715/853–855, 206
See application file for complete search history.

(56) References Cited

U.S. PATENT DOCUMENTS

| 5,297,039 | A | 3/1994 | Kanaegami et al. | |
| 7,200,804 | B1 | 4/2007 | Khavari et al. | |
| 7,809,801 | B1* | 10/2010 | Wang et al. | 709/217 |
| 2002/0130907 | A1* | 9/2002 | Chi et al. | 345/853 |
| 2005/0257400 | A1* | 11/2005 | Sommerer et al. | 36/13 |
| 2007/0174237 | A1* | 7/2007 | Wilbrink et al. | 707/3 |
| 2008/0306937 | A1* | 12/2008 | Whilte et al. | 707/5 |
| 2009/0172603 | A1* | 7/2009 | Young Suk Lee | 715/854 |
| 2010/0241940 | A1* | 9/2010 | Rao et al. | 715/205 |

FOREIGN PATENT DOCUMENTS

EP 1 643 390 5/2006

OTHER PUBLICATIONS

Brin et al., "The Anatomy of a Large-Scale Hypertextual Web Search Engine", Computer Science Department, Stanford Univercity, CA, Jun. 1999.
Haveliwala, "Topic-Sensitive PageRank: A Context-Sensitive Ranking Algorithm for Web Search", IEEE transactions on Knowledge and Data Engineering, Jul. 2003.
IBM Think Research, Featured Concept, Fetch!, http://domino.research.ibm.com/comm/wwwr_thinkresearch_nsf/ pages/ 20060627_dogear.html; Jun. 27, 2006, pp. 1-3.

(Continued)

*Primary Examiner* — Alicia Lewis
(74) *Attorney, Agent, or Firm* — Scully, Scott, Murphy & Presser, P.C.; Daniel P. Morris, Esq.

(57) ABSTRACT

A system, method and computer program product for presenting Uniform Resource Locator (URL) search results in response to a user query. The method includes receiving inputs from a plurality of users, each input from a respective user representing a path traversal of web pages identified by that user as having a relevance as determined by that user from a list of search result URLs generated by a search engine in response to a query. The system generates, from the received user inputs, a traversal result comprising a super directed graph, or a sub-directed graph constructed from the super directed graph, of web page nodes representing the URLs interconnected by edges, the super directed graph configured to include those URLs based on a popularity measure of the pages traversed; and the traversal result is displayed to include the URLs for user selection, in response to a subsequent user query.

24 Claims, 8 Drawing Sheets

(56) References Cited

OTHER PUBLICATIONS

Sumiya et al., "WebSkimming: An Automatic Navigation Method along Context-Path for Web Documents"; http://www2002.org/CDROM/poster/202/, 2002.

"Detecting Online Commercial Intention", Microsoft adCenter Labs; http://adlab.msn.com/OCI/oci.aspx; May 1, 2009.

Jansen et al., "Determining the User Intent of Web Search Engine Queries", WWW 2007, Poster Paper, May 8-12, 2007, Banff, Alberta, Canada, pp. 1149-1150.

Lee et al., "Automatic Identification of User Goals in Web Search", Proceedings of the World Wide Web Conference, May 10-14, 2005, Chiba, Japan.

* cited by examiner

METHOD AND SYSTEM FOR USER GUIDED SEARCH NAVIGATION

BACKGROUND

The present invention relates generally to information search and retrieval systems, and more particularly, navigation using electronic search engines. More particularly, the present invention relates to a user guided search navigation of search engine results.

Currently, Internet search or web search has been driving all internet related economics. There are many types of search engines doing Internet/web search with search engines now available for searching content based on traditional text, images, .pdf documents, and even audio content. Current search engines technology adapted for Internet searching are available from Google®, Yahoo!® and MSN®, for example, however there are also search engines available in recent times employing innovative technologies like Chacha® offering search using human assistance, and Guriji® offering search using native language support. There are search engine tools that collect search results from various sources and display them in a single location, like Dogpile®. A traditional search such as Google® displays the result set as a list one after another based on the page rank value for each of them.

Figure 1:
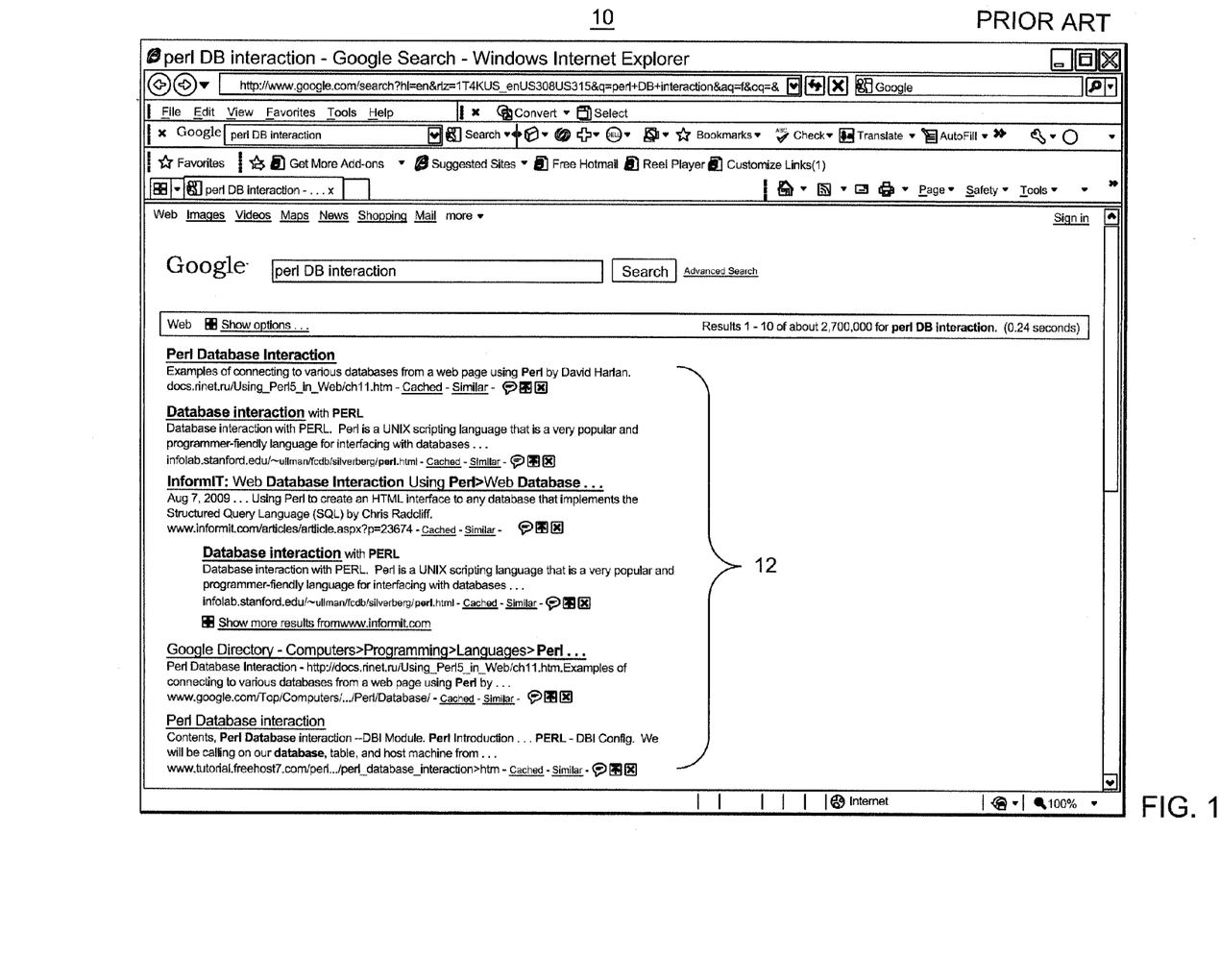
FIG. 1 illustrates a search result run through Google®, according to prior art, search results obtained based on a ranking application.

The current manner in which all search engines operate is, they search a set of keywords that are indexed and select the top 50 or 100 based on a ranking. For example, the Page Rank® algorithm used by Google® uses the incoming and outgoing hyperlinks to a web page to compute a page rank vector for the pages. FIG. 1 illustrates an example search result listing 10, obtained via a query run through a Google® search engine, where the results (i.e., web page URLs) 12 are obtained based on a ranking application and displayed for a user via a user's (client device) browser device.

The problem with the page rank algorithm is that each webpage includes a piece of information and a searcher has to connect these information for a particular searching to understand the concept he/she is searching in the internet. For example, User 1 searches "Perl for DB Interaction", and finds results ranked webpages 1, 2, 5 interesting. Similarly, User 2 searches for "Perl for DB interaction" and finds pages 1, 4, 5 to be relevant. User 1 and 2 also browsed in the following order 1->2->5 and 1->4->5 respectively. For this example, neither of the users browsed the hyperlinks within the page, but they browsed independent webpages in certain order to obtain the information for search string "Perl for DB Interaction".

In the above example, as shown in FIG. 1, Google® page Rank® will not be affected even after a multitude number of searchers (e.g., 1000) have browsed 1->4->5 in that order for many times. There is no way information about preferred traversal path over a set of URL for a given search is available to users. The problem of using previous search traversal information in addition to using page rank to display the results is more relevant for today's information world and with the proliferation of social-networks where there is a growing trend in sharing information and leveraging from other users internet activities.

In general this problem is found in various contexts such as Internet bookmarks (Google Bookmark), Social Bookmark (Dogear®).

Therefore, there is a need to produce a traversal pattern for a given or related query that captures the behavior of different users in the most efficient manner to guide a subsequent searcher through a plethora of search engine results.

It would be desirable to provide, for use in conjunction with an internet search browser, the ability to navigate a user, via a browser device, towards a target search content or information, by making use of that user's and/or other users' previous search result traversal information.

SUMMARY

A system, method and computer program product that aggregates the universe of previous traversals in users' web searches and present to a user only relevant previous traversals in a particular order to guide a web page searcher towards a search target.

The system provides, for an internet search browser, the ability to navigate a user towards the target search content or information, by making use of previous searcher's traversal information. The searcher is provided the most popular traversal path using an internet browser plug-in (e.g., Dogear®). The order of the pages traversed is identified using the history information of the page traversals.

In one embodiment, there is provided a method for presenting Uniform Resource Locator (URL) search results in response to a user query. The method comprises: receiving, at a computer device, inputs from a plurality of users, each input from a respective user representing a path traversal of web pages identified by that user as having a relevance as determined by that user from a list of search result URLs generated by a search engine in response to a query, generating, from the received user inputs, a traversal result comprising a super directed graph of web page nodes representing the URLs interconnected by edges, the super directed graph configured to include those URLs based on a popularity measure of the pages traversed; and displaying, via a display device, the traversal result to include the URLs for user selection, in response to a subsequent user query, wherein a program using a processor unit performs one or more of the receiving, generating, and displaying.

In another aspect there is provided a system for presenting Uniform Resource Locator (URL) search results in response to a user query. The system comprises a memory and a processor in communications with the memory, wherein the system is capable of performing a method comprising: receiving, at a computer device, inputs from a plurality of users, each input from a respective user representing a path traversal of web pages identified by that user according to a relevance as determined by that user from a list of search result URLs generated by a search engine in response to a query, generating, from the received user inputs, a traversal result comprising a super directed graph of web page nodes representing the URLs interconnected by edges, the super directed graph configured to include those URLs based on a popularity measure of the pages traversed; and displaying, via a display device, the traversal result to include the URLs for user selection, in response to a subsequent user query.

Further to this, there is provided a computer program product for presenting Uniform Resource Locator (URL) search results in response to a user query. The computer program product comprises: a storage medium readable by a processing circuit and storing instructions for performance by the processing circuit for performing a method comprising: receiving, at a computer device, inputs from a plurality of users, each input representing a path traversal of web pages identified by a user according to a relevance as determined by that user from a list of search result URLs generated by a search engine in response to a query, generating, from the received user inputs, a traversal result comprising a directed graph of web page nodes representing the URLs interconnected by edges, the super directed graph configured to include those URLs based on a popularity measure of the pages traversed; and displaying, via a display device, the traversal result to include the URLs for user selection, in response to a subsequent user query.

DESCRIPTION OF THE DRAWINGS

The accompanying drawings are included to provide a further understanding of the present invention, and are incorporated in and constitute a part of this specification. The drawings illustrate embodiments of the invention and, together with the description, serve to explaining the principles of the invention. In the drawings.

DETAILED DESCRIPTION

When a user, via a web browser, runs a query through a search engine, the user enters a search string and then obtains a list of documents as search results, e.g., web page links. In the following description, traversal paths (by user(s)) between pages are alternately referred to herein as "links" (not to be confused with hyperlinks). The search results presented are typically limited in the order the search engine believes best match with the search string entered e.g., via a ranking algorithm. The list of search results, in one example, may include the top 50 or 100 pages that match the search string on a ranking. For each page on the list, brief information about the page is also provided. The user may read the information about the page and decide whether a page is of interest to him/her. The user may additionally visit some of the listed pages in a particular order, which forms the user's traversal path.

This information of a user's path traversal is captured via software running on a server associated with the search engine, or a separate Internet based service. For instance, the user may browse by selecting one of the result "hits" (i.e., web page URLs), browse the various content and perhaps tag them using a string, and/or bookmark them. In one example embodiment, the user may bookmark using an in-page bookmarking tool or internet browser plugin (e.g., such as Dogear® trademark of Rocket Fuel Media, Inc., New York, USA) which helps to keep track of a user's position within a text and records a history of every page the user visited. The order of a user's traversal of the relevant results (web page URLs) may be based on the timestamp of user's "dogear" or bookmark.

Figure 2:
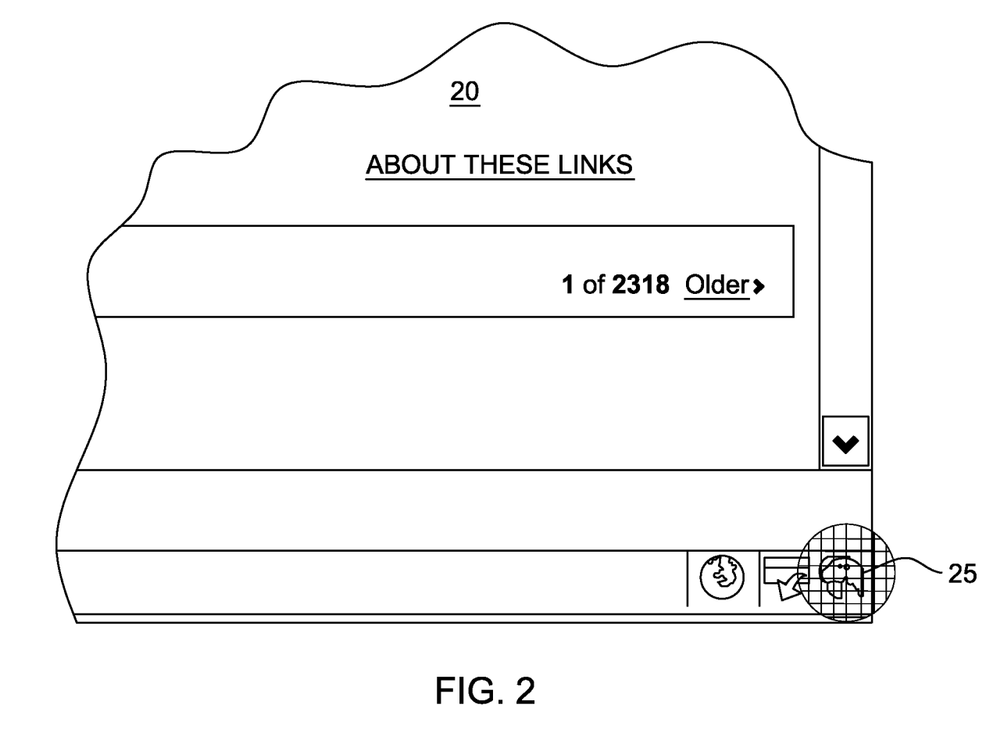
FIG. 2 illustrates the presentation of a user-selectable Dogear® plugin that maybe used in combination with a search engine of the invention.

FIG. 2 illustrates a portion of an example web-site 20 visited by a user that includes the aforementioned bookmark plug-in, i.e., Dogear® plugin installed in that user's browser device and represented in the browser taskbar as an icon 25. Alternately, a social bookmarking service which allows people to bookmark web-content, tag it, and share it can be implemented in a further embodiment. Use of the Dogear® plugin for bookmarking web pages for users is known and the mechanisms for outputting user bookmarks (or a dogear) indicating a navigation to that web page is via a data feed provided to the server over an Internet connection. An API is further provided at a web server, e.g., a third party service, so that the method of the invention can receive the feed and integrate with it.

The invention provides for the aggregation of users' path traversals, e.g., as captured and recorded at a web server (e.g., providing a web service) via the receipt of bookmarks fed from user devices via their use of the browser dogear or like web page bookmarks. That is, for many other users that run similar queries through the search engine, each of those users will generate a feed that includes that user's traversal path based on their accessing web page results for a similar query. The user's traversal path represent user guided inputs comprising an order of relevant pages and/or sections of web pages selected by a searcher for a search conducted in response to a user query. The relevant pages and sections of pages may comprise data, audio/video or multi-media content, and/or software programs. Given these traversal paths, the system and method produces the most relevant traversal path for presentation to a subsequent user who has entered similar search string.

Figure 3:
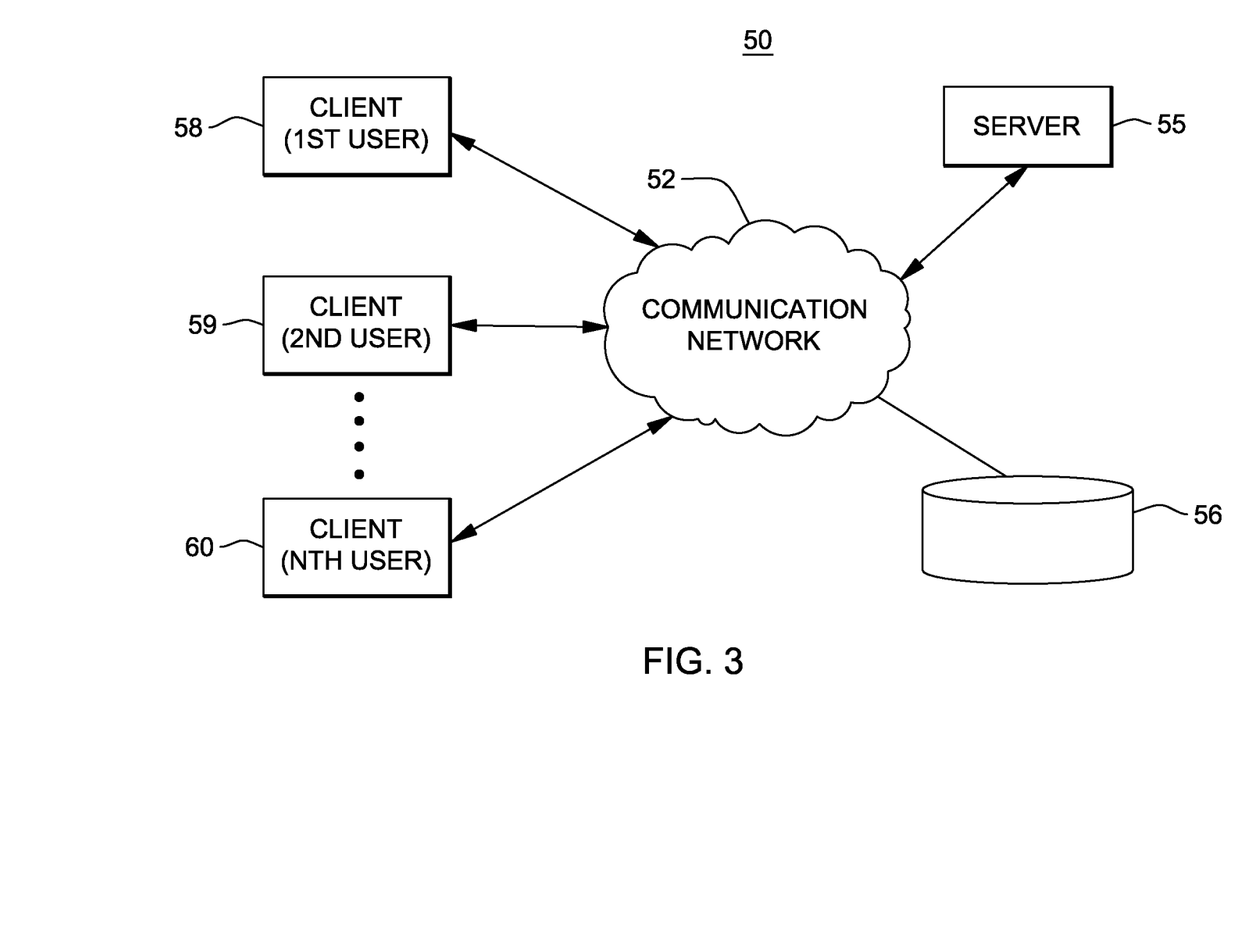
FIG. 3 is an exemplary block diagram of a distributed data processing system 50 in which the present invention may be implemented.

As shown in FIG. 3 there is shown an exemplary block diagram of a distributed data processing system 50 in which the present invention may be implemented. As shown, a computing environment 50 includes a network 52, which is the medium used to provide communications links between various devices and computers connected together within data processing system 50. Network 52 may include connections, such as wire, wireless communication links, or fiber optic cables. In the depicted example, a server 55, which may comprise a web server implementing a search engine is connected to network 52 along with a memory storage unit 56. In addition, client devices 58-60, which may include PC, wired or wireless mobile computing devices, and the like, that implement browsers having the bookmark or dogear plug-in, for example, are also connected to network 52. In the depicted example, server 55 provides data, such as boot files, operating system images, and applications to clients 58-60. Clients 58-60 are clients to server 55. Network data processing system 50 may include additional servers, clients, and other devices not shown. In the depicted example, network data processing system 50 is the Internet with network 52 representing a worldwide collection of networks and gateways that use, for example, the Transmission Control Protocol/Internet Protocol (TCP/IP) suite of protocols to communicate with one another. At the heart of the Internet is a backbone (not shown) comprising high-speed data communication lines between major nodes, host computers, and thousands of other computer systems that route data and messages. It is understood that network data processing system 50 also may be implemented as a number of different types of networks, such as for example, an intranet, a local area network (LAN), or a wide area network (WAN). FIG. 3 is intended as an example, and not as an architectural limitation for the present invention.

In operation, the web server 50 and processing unit therein implements a method that collects all of the users' search paths associated with selected results of a common (similar) search query, via the user's activation of the bookmark or dogear. The server receives the query in a predetermined format and associates the new user submitted query with the traversal path information (directed graphs) of prior user search queries. In one embodiment, the server implements functions that compare the query string with a list of recorded previous queries or some metadata tag classification of queries using a similarity measure. In one embodiment, a similarity measure is defined as a distance metric between two search keywords using one of a syntactical or semantic analysis. A description of an example use of similarity measures can be found in U.S. Pat. No. 5,297,039. The method then assigns a rank value to the path nodes (web page results traversed) and to the path edges depending upon their popularity (e.g., the frequency of visits to a web-page and the frequency of using a particular edge). As will be described in greater detail herein below, the web server or processing unit implements a method for merging the traversal patterns of different users for a given/related query and producing a traversal pattern for the query capturing the behavior of different users in the most efficient manner. That is, in one embodiment, the system and method performs a merging of web-graphs from different users in a manner such that the "merged" web-graph represents a preferred traversal path for an arbitrary user.

The traversal information of these users, when aggregated, forms a universe of traversal information that can be used to guide a current user ("user with a similar search string"). Hereafter, a value "m" is designated as the total number of users that provide information constituting the universe of traversal information, with m being an arbitrary natural number.

For example, suppose m=3, i.e., three users: user 1, user 2 and user 3, each of whom runs the search string "Perl for DB Interaction" or a similar query related on a search engine. The search result has a long list of results corresponding to different web pages. Among the search results produced by the search engine, the three users are interested in different pages and have different traversal paths. In the example, suppose they are interested in pages 1-8 of the listed pages.

User 1 visited the pages in the order of P2->P1->P2->P3. User 2 visited the pages in the order of P2->P1->P5->P1->P6. User 3 visited the pages in the order of P1->P2->P5-> P2->P7->P2->P2->P1->P8. Using the similarity measures the web server determines that a current user has submitted the same (or similar) query as the prior query of prior user(s) having already traversed relevant paths. A metadata tag that is constructed from key words of past users search queries is used to identify the graphs G, G' and G" for the new users submitted query.

The aforementioned users' traversal paths can be viewed as directed graphs with the pages as nodes that are linked by the traverse as directed edges. Thus, the "m" user inputs received at the server may be converted to a number "m" data structures representing directed graphs 'g_i' each with 'n_i' nodes representing web pages and 'e_i' edges representing the respective navigation path (a directed flow between web pages nodes) and "i" is the index of graphs from 1 to m. From the traversal paths submitted, e.g., from Dogear® or similar user bookmark information received at the server, the data structures are processed/converted and/or stored at the server to generate the respective directed graphs. For example, a user's Dogear® bookmarks including data in an example form such as: {query string, pages bookmarked with time stamp} are received at the server. The server recognizes the query string using the meta tag information and constructs the traversal graph G from the pages bookmarked using their time stamp. This functionality is implemented on the server side. It can be offered by dogear or any other third party as a service. These data structures are input to the server that implements the method of the present invention to generate a single "super" directed graph 'G' having 'N' nodes representing web pages and 'E' edges representing navigation paths. The N nodes may comprise a subset of the union of the n_i nodes, E is a subset of the union of e_i edges.

As performed by the processing unit of server device 55, for each of the pages the user(s) have visited, there is a rank value first assigned or associated with it. The rank value may be computed using different algorithms. In one embodiment, the rank value is computed using a Top 'n' Ranks algorithm. That is, a page rank or similar ranking algorithm, such as a Context Sensitive Page Rank, may be used to determine the top "n" node (web page results) to present to the user. The Context Sensitive Page Rank is disclosed in Haveliwala, T. H., *Topic-sensitive PageRank: a context-sensitive ranking algorithm for Web search*, IEEE transactions on Knowledge and Data Engineering, July 2003.

In another embodiment, a Top 'n' Frequency algorithm is used to compute the rank value of the pages. That is, edge frequency is used to rank the pages in terms of the most popular traversal.

An example application is now provided. It is supposed, in the example application, the rank values of the pages are computed as shown in Table 1 below:

TABLE 1

| Web Page | P1 | P2 | P3 | P4 | P5 | P6 | P7 | P8 |
|---|---|---|---|---|---|---|---|---|
| F(CSPR, Freq) | 30 | 40 | 5 | 35 | 25 | 30 | 35 | 10 |

Next, the edges between the pages are determined as shown in Table 2 below:

TABLE 2

| Edge | e1 | e2 | E3 | e4 | e5 | e6 | e7 | E8 | e9 | e10 | e11 |
|---|---|---|---|---|---|---|---|---|---|---|---|
| Begin -> | P1 -> | P2 -> | P2 -> | P1 -> | P5 -> | P1 -> | P2 -> | P5 -> | P2 -> | P7 -> | P1 -> |
| end | P2 | P1 | P3 | P5 | P1 | P6 | P5 | P2 | P7 | P2 | P8 |
| Freq | 2 | 3 | 1 | 1 | 1 | 1 | 1 | 1 | 1 | 1 | 1 |

An edge is a directed flow from a beginning page to an end page and the frequency are obtained using the individual users' travel graphs. For example, user 1 first visits page P2. The next page s/he visits is P1. In this traverse, an edge e2 is defined directed from P2 to P1. Next, user 1 goes back from P1 to P2. Because this traverse has a different direction, another edge, namely e1, is defined for this traverse. In the example application, the frequency data shown in Table 2 represents the frequency of edge traversals from the individual user's traversal graphs for the above-mentioned example users 1, 2 and 3.

According to one embodiment, the traversal paths of the m users are sorted to graphs g_i, (1≤i≤m) using, in one embodiment, a lexicographic order (e.g., dictionary order, i.e., an order arranged according to words in a dictionary) based on history information on frequency of access of pages in those traversal paths. Sorting of the graphs is performed by comparing the value of the pages (access frequency) in the order they were traversed by different users, such that, if the $K^{th}$ page of graph g_i is represented as g_i_k, then Value(g_i_k)>=Value(g_(i+1)_k) for all pages at position k, k=1, 2, ..., K. That is, in one embodiment, the graphs are sorted in a decreasing order of the content value. The content value can also be defined in terms of the frequency of the edges rather than the frequency of pages traversed or a combination of both or some other attributes of pages and/or edges.

In this example, g_1_1 and g_2_1 is P2, which has a content value of 40 as shown in the example ranked results of Table 1; whereas g_3_1 is P1, which has a content value of 30. Therefore, g_1 and g_2 are placed ahead of g_3. Further, even though g_1 and g_2 both have the same first two pages, P2 and P1, between the third pages visited, g_1_3 is P2, which has a content value of 40, whereas g_2_3 is P5, which is 25. Therefore, g_1 is placed ahead of g_2. Finally, the three graphs are ranked in the order of g_1>g_2>g_3. In this example, the user's numerical order coincides with their graph rank order, that is, user 1's path is sorted in g_1, user 2's path is sorted in g_2 and user 3's path is sorted in g_3. In other examples, the users may have a numerical order different from the graph rank order. Nevertheless, when sorted, graph g_i will always contain the user having the $i^{th}$ biggest content value.

After the sorting is performed, each g_i (1≤i≤m) is merged into a super graph G one by one. The algorithm is shown as follows:

```
For i=1,...,m
  1. For each edge e_i_k in g_i (V, E)
    i. Check whether edge e_i_k is not in G and (source vertex S_e_i_k and
       the destination vertex D_e_i_k of edge e_i_k are both NOT present in G)
      1. Then insert (S_e_i_k, D_e_i_k, e_i_k) in to G
```

In the above algorithm, symbols V and E in graph g_i (V, E) represent the sets of vertexes (pages) and edges in graph g_i, respectively; source vertex S_e_i_k and destination vertex D_e_i_k represent a starting page and an ending page of an edge e, respectively.

According to the method, each edge in g_i (1≤i≤m) is checked. The super graph G is built up as follows: for each edge e_i_k in g_i, check whether e_i_k is in G. If e_i_k is there already, it is not inserted to G. If e_i_k is not found, then further check whether both the source vertex S_e_i_k and the destination vertex D_e_i_k are in G. When both S_e_i_k and D_e_i_k are in G, do not insert to G. Only when one or both of S_e_i_k and D_e_i_k are not in G, insert edge e_i_k and the lacking vertexes. This process is repeated until all graphs g_i (1≤i≤m) is merged to G.

Figure 4A:
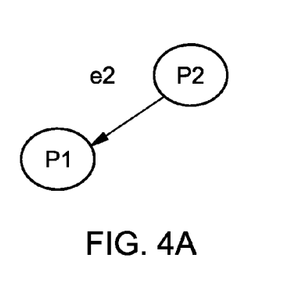
FIGS. 4A-4D illustrate the process of constructing a super directed graph G.
Figure 4B:
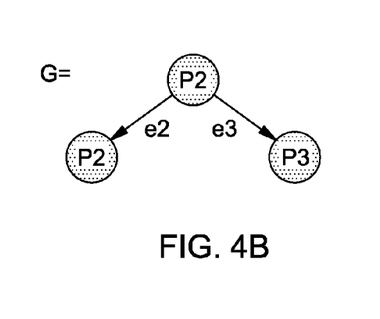
Figure 4C:
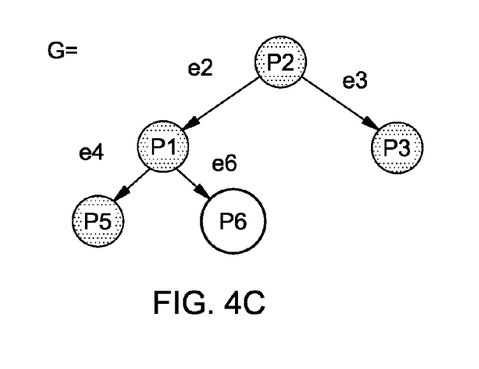
Figure 4D:
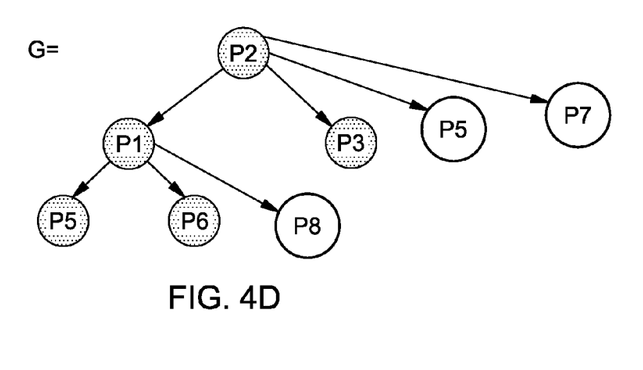

FIGS. 4A-4D illustrate the process with respect to the example of 3 users. First, g_1 is examined. For the first traversal for user 1, P2->P1 corresponding to e2, because e2, P2 and P1 are not in G (G is empty now), they are added to G, as shown in FIG. 4A. For the next traversal of user 1, P1->P2 corresponding to e1, even though e1 is not in G, because P1 and P2 are already in G, it is not added. The last traverse by user 1 is P2->P3 corresponding to e3. e3 is still added to G because it is not in G, and even though P2 is in G, P3 is not, according to the method. FIG. 4B illustrates G after inserting e3. Similar process takes place with regard to g_2 and g_3. FIG. 4C illustrates G when g_2 has been merged to G which shows the union to graph G of nodes P5 and P6 via respective path edges e4, e6 and FIG. 4D illustrates G after g_3 has been merged into G. G thus becomes a super directed graph.

The super graph G generated forms a tree structure. In one embodiment, after G is generated, processing is performed that determines a sub graph G' from G, e.g., by trimming some of the edges and nodes (pages) in G. For example, a priority order may dictate which nodes in G will be presented to a user in response to that user's preference.

Figure 5A:
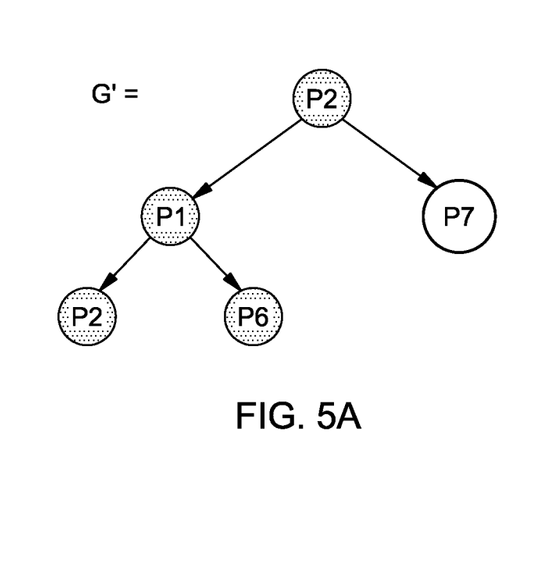
FIGS. 5A-5B illustrate examples of sub directed graph G'.

In one embodiment, a Top 'n' Ranks algorithm is used. That is, use page rank or similar rank, such as a Context Sensitive Page Rank, to determine the top n nodes to present. The Context Sensitive Page Rank ("CSPR") is disclosed in Haveliwala, T. H., *Topic-sensitive PageRank: a context-sensitive ranking algorithm for Web search*, IEEE transactions on Knowledge and Data Engineering, July 2003. FIG. 5A shows the sub graph G' using the CSPR algorithm.

Figure 5B:
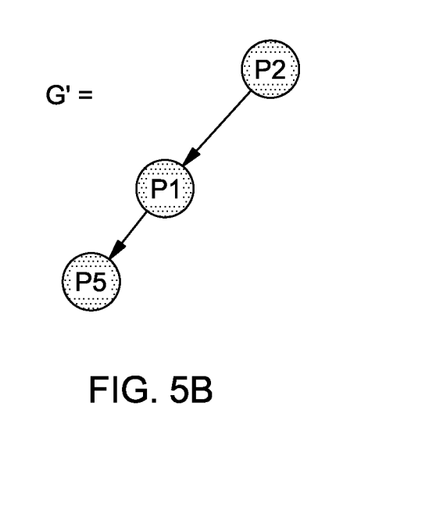

In another embodiment, a Top 'n' Frequency algorithm is used. That is, edge frequency is used to rank the pages in terms of the most popular traversal. FIG. 5B shows the sub graph G' using the Top 'n' Frequency algorithm.

In still another embodiment, the combination of the Top 'n' Ranks algorithm and the Top 'n' Frequency can be used.

Figure 6A:
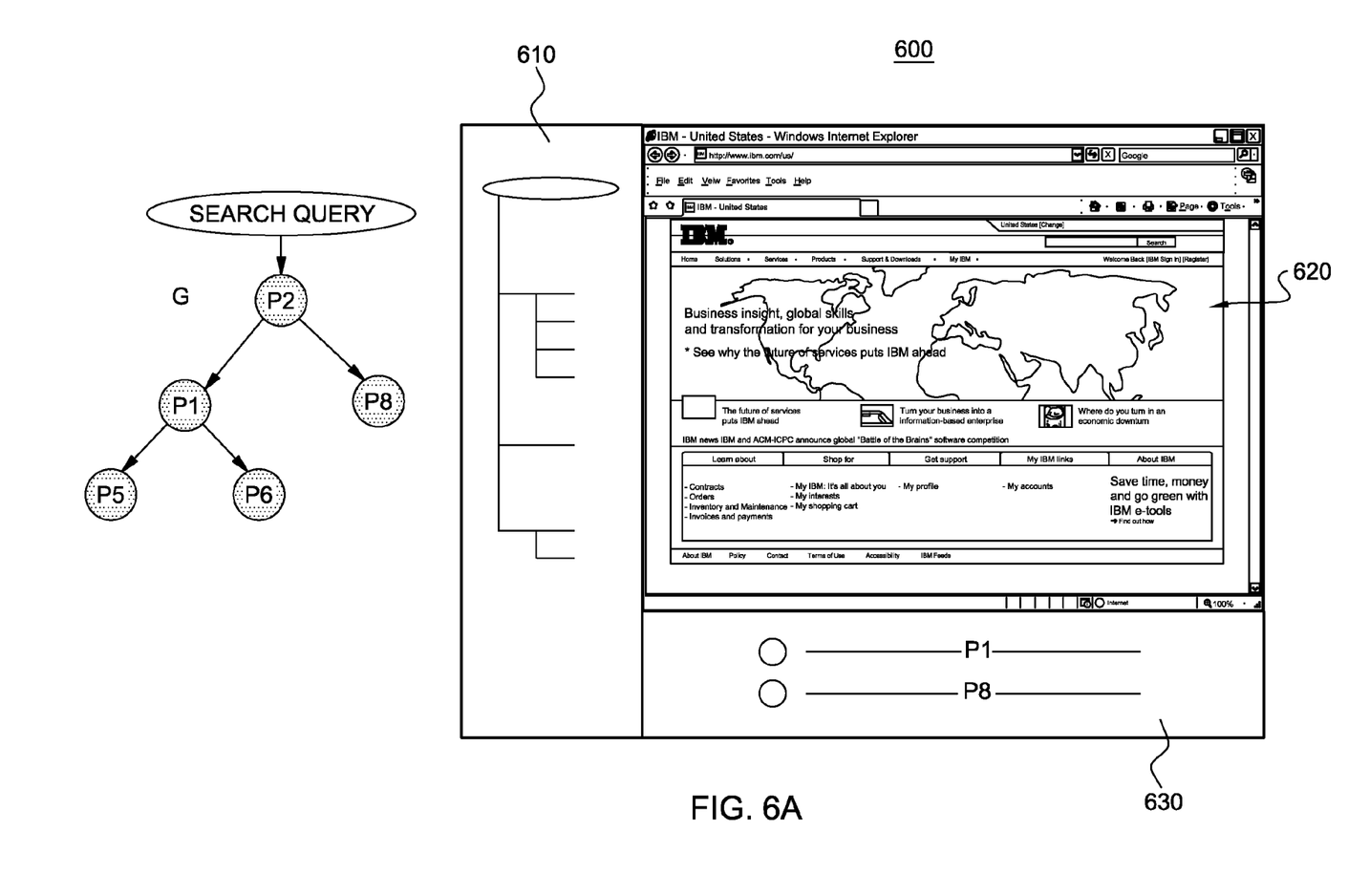
FIGS. 6A-6B illustrates displaying traversal search results to a user (searcher)
Figure 6B:
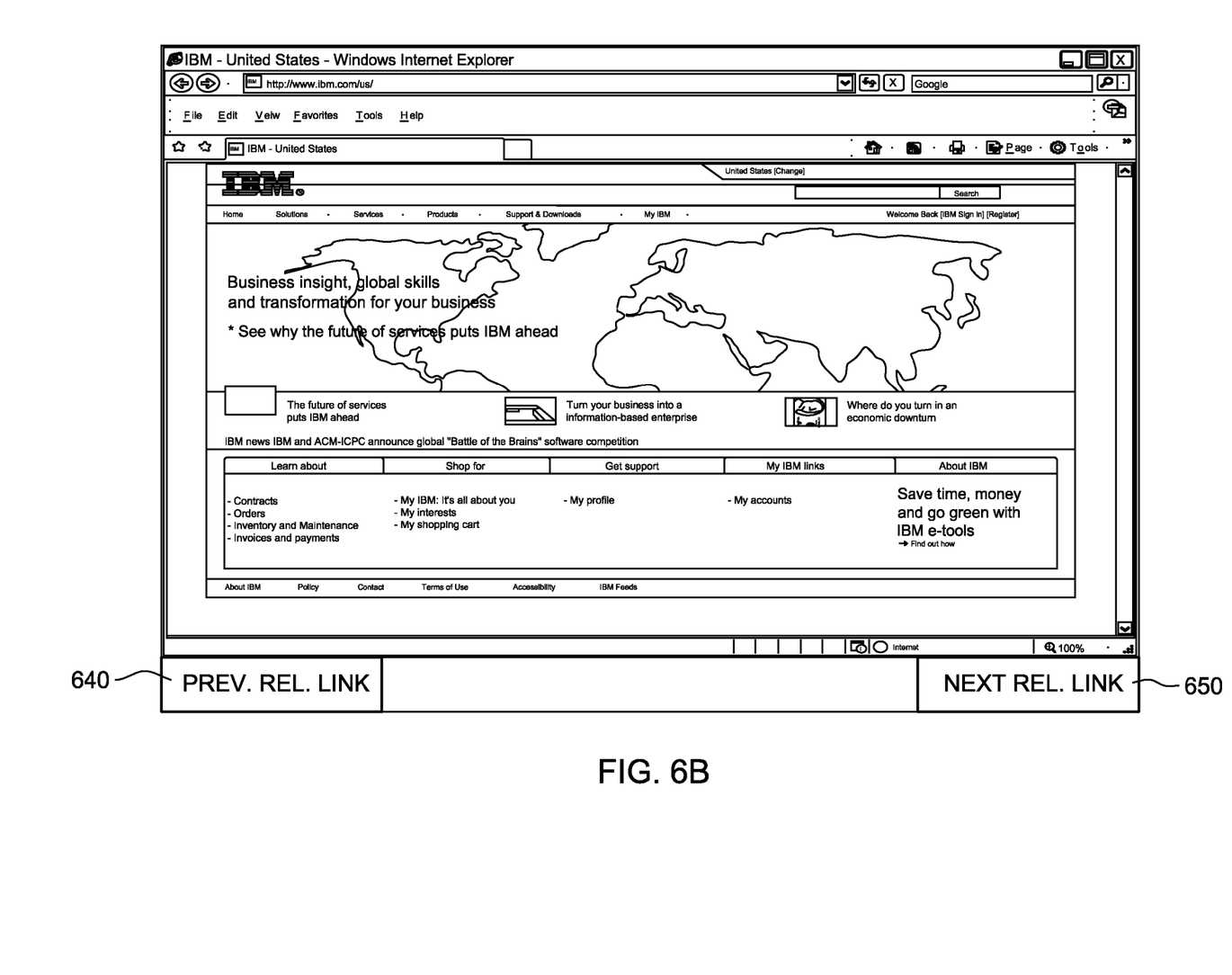

Next, the results are displayed to the current user via a display generated at a user's browser 600 as shown in FIGS. 6A and 6B. In one embodiment of the present invention, super directed graph G in its entirety is displayed for the current user, via that user's browser device, in the form of a Tree browser portion 610 as shown in FIG. 6A. The current page visited is shown in Page browser portion 620. At each level of the tree structure of G, all its children pages to the currently displayed page are displayed in the option browser 630. In this example, the currently displayed page in Page browser 620 is P2 and its children pages, P1 and P8, are displayed in the Option browser 630. This display scheme gives the user an easy and guided approach in accessing the pages. The current user may visit all pages shown in the Tree browser 610. When the user is visiting a page, the children pages are also presented in the Option browser, which helps the current user to navigate the super graph G.

In another embodiment, the current user who intends to view pages in certain sequence and does not wish to view the trees and options is presented with the display shown in FIG. 6B. The system generates a single web page shown on the display with a Prev.Rel.Link tab 640 linking to a previous related page and a Next Rel. Link tab 650 linking to a next related page shown on the bottom of the display. The traversal path for this approach is determined by G".

G" is the traversal path for the super graph G, which is the order for which the pages in G are displayed. For example, a breadth first search of G can be conducted for users in one embodiment. Likewise, for users who prefer viewing the depth first, a depth first search can be conducted. That is, for the super graph G illustrated in FIG. 4D, one G" using breadth first search is: G"=P2->P1->P3->P7->P8->P5->P6 and the other G" using depth first search would be: G"=P2->P1->P5->P6->P3->P7->P8.

Using the traversal path G", the current user can browse the pages one by one in a forward or backward direction, such as via the browser interface shown in FIG. 6B, for example.

Figure 7:
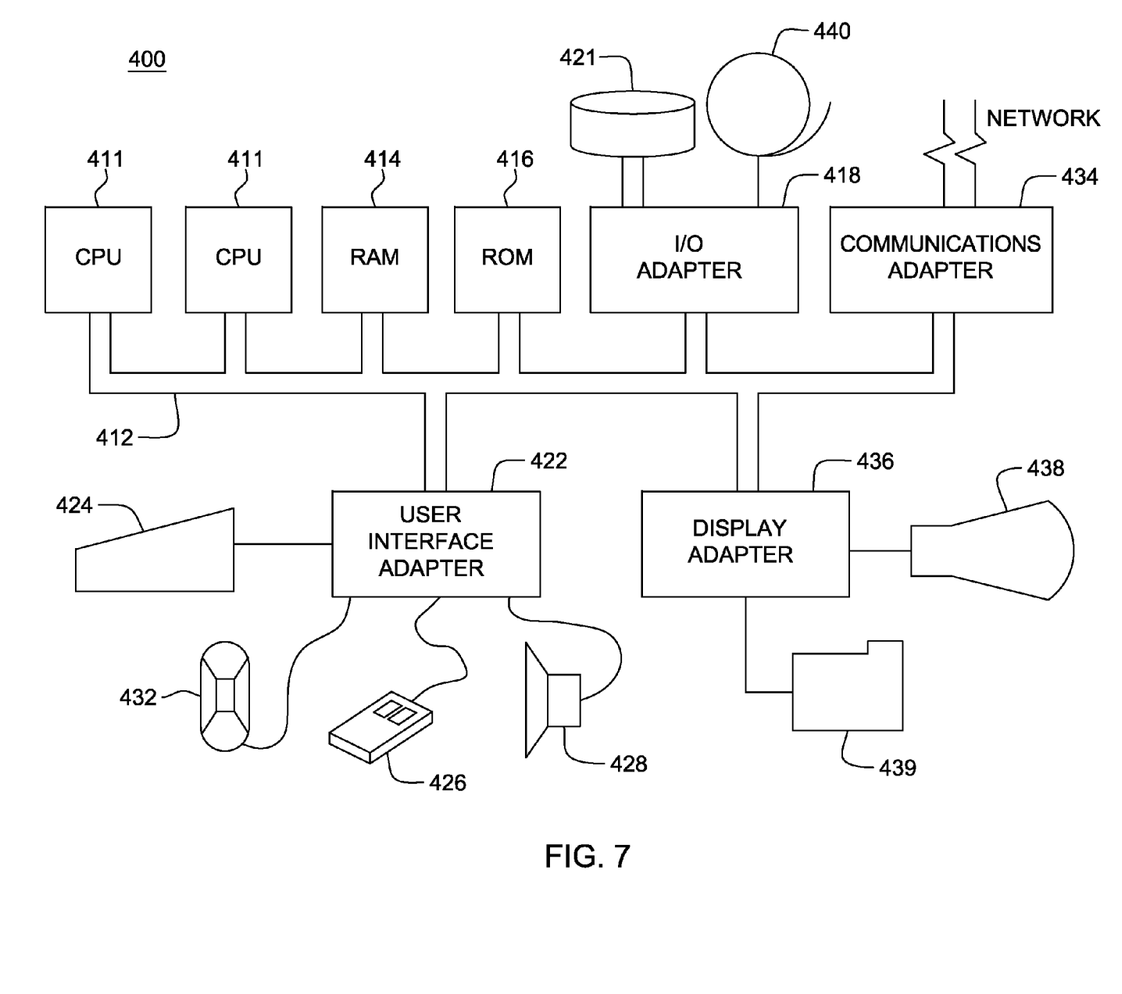
FIG. 7 illustrates an exemplary hardware configuration of a computing system 400 running and/or implementing the methods of the described embodiments.

FIG. 7 illustrates an exemplary hardware configuration of a computing system 400 including a server device or service running and/or implementing the method steps described herein. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions runnable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method for presenting Uniform Resource Locator (URL) search results in response to a user query comprising:
   receiving, at a computer device, inputs from a plurality of users, each input from a respective user representing a path traversal order of web pages identified by that user as having a relevance as determined by that user from a list of search result web pages, embodied as Uniform Resource Locators (URLs) generated by a search engine in response to a query,
   generating a plurality of directed graphs, each directed graph corresponding to a respective user input, each respective directed graph consisting of a plurality of edges and nodes, each said node corresponding to a page traversed by a user and each directed edge corresponding to a traversal from a starting node to an end node;
   sorting said plurality of directed graphs in a decreasing order of content value;
   generating a traversal result comprising a super directed graph of web page nodes representing said URLs interconnected by edges, said traversal result generating comprising:
      initializing said super directed graph as empty; and
      for each directed graph in said decreasing order,
         obtaining a current edge between a source node and the destination node in said directed graph;
         checking whether one of or both of a source vertex node and a destination vertex node of the current edge are not present in said super graph; and
         if one or both vertex nodes are not present, inserting the edge into said super directed graph and the lacking edge node vertice(s); and
      repeating said obtaining, checking and inserting for each edge of each directed graph, wherein said super directed graph includes those URLs based on a popularity measure of said pages traversed by each user; and
   displaying, via a display device, said traversal result to include said URLs for user selection, in response to a subsequent user query,
   wherein a programmed processor unit performs one or more of said receiving, generating, sorting, traversal result generating and displaying,
   wherein said search results represent user guided inputs comprising an order of relevant pages and sections of pages selected by a searcher for a search conducted in response to said user query.

2. The method as claimed in claim 1, wherein said popularity measure is determined according to one of page rank, time spent in a page and frequency of visits to a page as determined from each users inputs, or combinations thereof.

3. The method as claimed in claim 2, wherein said traversal result comprises a sub-directed graph constructed from said super directed graph.

4. The method as claimed in claim 3, wherein said sub directed graph is constructed based on a popularity measure, a popularity measure comprising a page rank, edge frequency or a combination of the page rank and the edge frequency, or combinations thereof.

5. The method as claimed in claim 2, wherein said traversal result comprising said super directed graph is displayed according to one of a breadth first fashion or a depth first fashion, or a combination breadth first and depth first fashion.

6. The method as claimed in claim 1, wherein the displaying said traversal result includes one or more of:
displaying said traversal result in a tree browser format;
displaying said traversal result in a page browser format;
and displaying said traversal result in an option browser format.

7. The method in claim 3, wherein the displaying said traversal result comprises:
constructing a traversal path from said sub graph; and
displaying said traversal path using a previous relevant link and a next relevant link.

8. The method as claimed in claim 1, wherein said sorting said plurality of directed graphs in a decreasing order of content value is based on occurred page visit frequency values, wherein a $k^{th}$ page of a directed graph g_i, where i>=1, is represented as g_i_k, said sorting comprises:
comparing the page visit frequency value of the pages in the order they were traversed by different users, such that a visit frequency value(g_i_k) is greater or equal to a visit frequency value(g_(i+1)_k) for all pages at the $k^{th}$ position of each graph.

9. The method as claimed in claim 1, further comprising:
assigning a page rank value for each page traversed by each said users, wherein said content value is based on a computed page rank.

10. The method as claimed in claim 1, further comprising:
determining, based on each user's traversal path, all edges between the pages traversed, an edge being a directed flow between a first and second page, a different edge determined based on a direction of flow between two like pages; and
obtaining an edge frequency for each determined edge using said each user's traversal path, wherein said content value is based on said determined edge frequency.

11. A system for presenting Uniform Resource Locator (URL) search results in response to a user query comprising:
a memory;
a processor in communications with the memory, wherein the system is capable of performing a method comprising:
receiving, at a computer device, inputs from a plurality of users, each input from a respective user representing a path traversal order of web pages identified by that user according to a relevance as determined by that user from a list of search result URLs generated by a search engine in response to a query,
generating a plurality of directed graphs, each directed graph corresponding to a respective user input, each respective directed graph consisting of a plurality of edges and nodes, each said node corresponding to a page traversed by a user and each edge corresponding to a traversal from a starting node to an end node;
sorting said plurality of directed graphs in a decreasing order of content value;
generating a traversal result comprising a super directed graph of web page nodes representing said URLs interconnected by edges, said traversal result generating comprising:
initializing said super directed graph as empty; and for each directed graph in said decreasing order,
obtaining a current edge between a source node and the destination node in said directed graph;
checking whether one of or both of a source vertex node and a destination vertex node of the current edge are not present in said super directed graph; and
if one or both vertex nodes are not present, inserting the edge into said super graph and the lacking edge node vertice(s); and
repeating said obtaining, checking and inserting for each edge of each directed graph, wherein said super directed graph includes those URLs based on a popularity measure of said pages traversed by each user; and
displaying, via a display device, said traversal result to include said URLs for user selection, in response to a subsequent user query.

12. The system as claimed in claim 11, wherein said popularity measure is determined according to one of page rank, time spent in a page and frequency of visits to a page as determined from each users inputs, or combinations thereof.

13. The system as claimed in claim 12, wherein said traversal result comprises a sub-directed graph constructed from said super directed graph.

14. The system as claimed in claim 13, wherein said sub directed graph is constructed based on a popularity measure, a popularity measure comprising a page rank, edge frequency or a combination of the page rank and the edge frequency, or combinations thereof.

15. The system as claimed in claim 11, wherein, said sorting of said plurality of directed graphs in a decreasing order of content value is based on occurred page visit frequency values, wherein a $k^{th}$ page of a directed graph g_i, where i>=1, is represented as g_i_k, said sorting comprises:
comparing the page visit frequency value of the pages in the order they were traversed by different users, such that a visit frequency value(g_i_k) is greater or equal to a visit frequency value(g_(i+1)_k) for all pages at the $k^{th}$ position of each graph.

16. The system as claimed in claim 11, further comprising:
assigning a page rank value for each page traversed by each said users, wherein said content value is based on a computed page rank.

17. The system as claimed in claim 11, further comprising:
determining, based on each user's traversal path, all edges between the pages traversed, an edge being a directed flow between a first and second page, a different edge determined based on a direction of flow between two like pages; and
obtaining an edge frequency for each determined edge using said each user's traversal path, wherein said content value is based on said determined edge frequency.

18. A computer program product for presenting Uniform Resource Locator (URL) search results in response to a user query, the computer program product comprising:
a storage medium readable by a processing circuit and storing instructions for performance by the processing circuit for performing a method comprising:
receiving, at a computer device, inputs from a plurality of users, each input representing a path traversal order of web pages identified by a user according to a relevance as determined by that user from a list of search result URLs generated by a search engine in response to a query, generating a plurality of directed graphs, each directed graph corresponding to a respective user input, each respective directed graph consisting of a plurality of edges and nodes, each said node corresponding to a page traversed by a user and each edge corresponding to a traversal from a starting node to an end node;

sorting said plurality of directed graphs in a decreasing order of content value;

generating a traversal result comprising a super directed graph of web page nodes representing said URLs interconnected by edges, said traversal result generating comprising:

initializing said super directed graph as empty; and for each directed graph in said decreasing order, obtaining a current edge between a source node and the destination node in said directed graph;

checking whether one of or both of a source vertex node and a destination vertex node of the current edge are not present in said super directed graph; and if one or both vertex nodes are not present, inserting the edge into said super graph and the lacking edge node vertice(s); and repeating said obtaining, checking and inserting for each edge of each directed graph, wherein said super directed graph includes those URLs based on a popularity measure of said pages traversed by each user; and displaying, via a display device, said traversal result to include said URLs for user selection, in response to a subsequent user query.

19. The computer program product as claimed in claim 18, wherein said traversal result comprises a super directed graph, said popularity measure is determined according to one of page rank, time spent in a page and frequency of visits to a page as determined from each users inputs, or combinations thereof.

20. The computer program product as claimed in claim 19, wherein said traversal result comprises a sub-directed graph constructed from said super directed graph.

21. The computer program product as claimed in claim 20, wherein said sub directed graph is constructed based on a popularity measure, a popularity measure comprising a page rank, edge frequency or a combination of the page rank and the edge frequency, or combinations thereof.

22. The computer program product as claimed in claim 18, wherein, said sorting of said plurality of directed graphs in a decreasing order of content value is based on occurred page visit frequency values, wherein a $k^{th}$ page of a sorted directed graph $g\_i$, where $i >= 1$, is represented as $g\_i\_k$, said sorting comprising:

comparing the page visit frequency value of the pages in the order they were traversed by different users, such that a visit frequency value($g\_i\_k$) is greater or equal to a visit frequency value($g\_(i+1)\_k$) for all pages at the $k^{th}$ position of each graph.

23. The computer program product as claimed in claim 18, further comprising:

assigning a page rank value for each page traversed by each said users, wherein said content value is based on a computed page rank.

24. The computer program product as claimed in claim 18, further comprising:

determining, based on each user's traversal path, all edges between the pages traversed, an edge being a directed flow between a first and second page, a different edge determined based on a direction of flow between two like pages; and obtaining an edge frequency for each determined edge using said each user's traversal path, wherein said content value is based on said determined edge frequency.

\* \* \* \* \*